(12) United States Patent
Huisman

(10) Patent No.: US 7,850,883 B2
(45) Date of Patent: Dec. 14, 2010

(54) APPARATUS AND METHOD FOR INJECTION MOULDING WITH VENTILATION MEANS

(75) Inventor: Jan Wietze Huisman, Bellingwolde (NL)

(73) Assignee: Vertis B.V., Veendam (NL)

( * ) Notice: Subject to any disclaimer, the term of this patent is extended or adjusted under 35 U.S.C. 154(b) by 830 days.

(21) Appl. No.: 10/529,950

(22) PCT Filed: Oct. 8, 2003

(86) PCT No.: PCT/NL03/00682

§ 371 (c)(1),
(2), (4) Date: Jun. 10, 2005

(87) PCT Pub. No.: WO2004/033179

PCT Pub. Date: Apr. 22, 2004

(65) Prior Publication Data

US 2006/0006570 A1 Jan. 12, 2006

(30) Foreign Application Priority Data

Oct. 8, 2002 (NL) .................................... 1021601

(51) Int. Cl.
*B29C 44/00* (2006.01)
(52) U.S. Cl. .......................................... 264/51; 264/41
(58) Field of Classification Search ............. 425/817 R, 425/812; 264/41, 37.1, 37.14, 37.15, 37.18, 264/37.27
See application file for complete search history.

(56) References Cited

U.S. PATENT DOCUMENTS

| 3,970,732 | A | | 7/1976 | Slaats et al. |
| 5,059,376 | A | * | 10/1991 | Pontiff et al. ................ 264/234 |
| 6,251,318 | B1 | * | 6/2001 | Arentsen et al. ........... 264/45.5 |
| 2001/0036971 | A1 | | 11/2001 | Usui et al. |

FOREIGN PATENT DOCUMENTS

| DE | 39 40 824 A1 | 6/1991 |
| DE | 3940824 | 6/1991 |
| DE | 196 17 284 A1 | 11/1997 |
| DE | 19617284 | 11/1997 |
| EP | 0 895 847 A2 | 2/1999 |
| EP | 1 110 694 A1 | 6/2001 |
| JP | 2000-176956 | 6/2000 |

* cited by examiner

*Primary Examiner*—Christina Johnson
*Assistant Examiner*—Galen Hauth
(74) *Attorney, Agent, or Firm*—Hoffman & Baron, LLP

(57) ABSTRACT

An apparatus for injection molding products from a mass including at least natural mono or polymers, provided with at least one mold cavity (2) and a deaeration channel (10) at least partly surrounding the mold cavity (2), wherein, between the deaeration channel and the mold cavity an overflow (8) space is provided which, on the one side, is in communication with the deaeration channel and, on the other side, with the mold cavity (2).

9 Claims, 3 Drawing Sheets

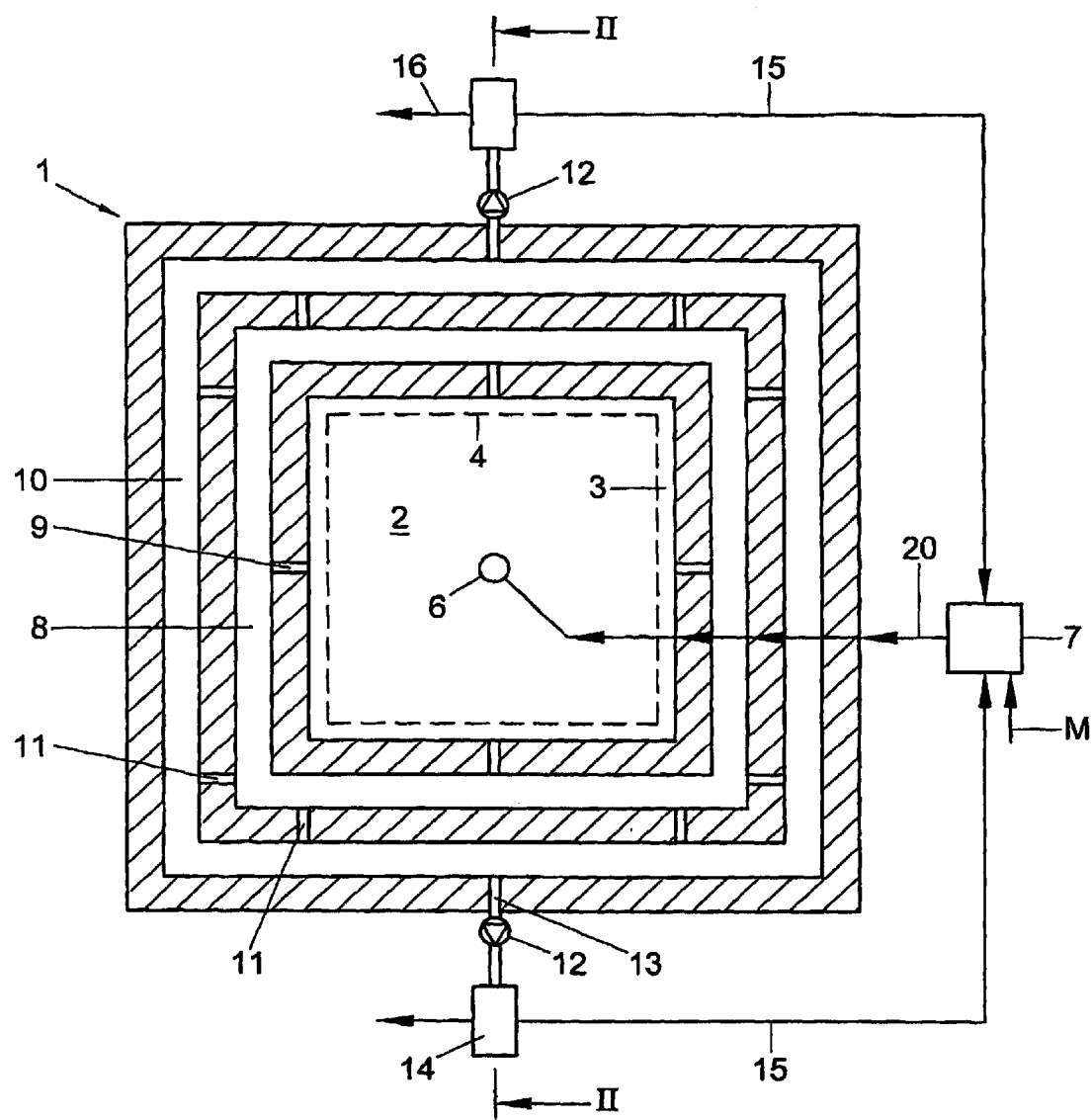
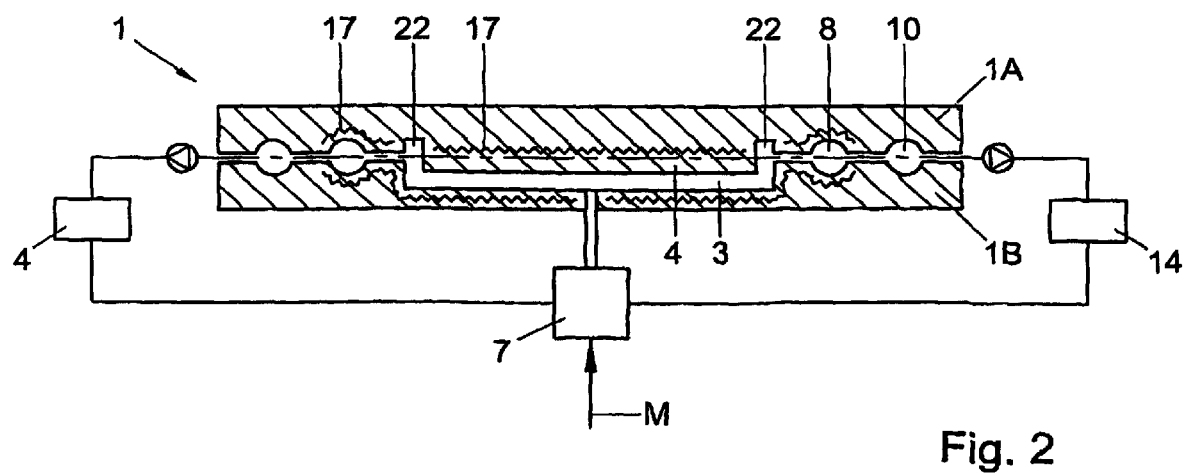
Fig. 1
Fig. 2

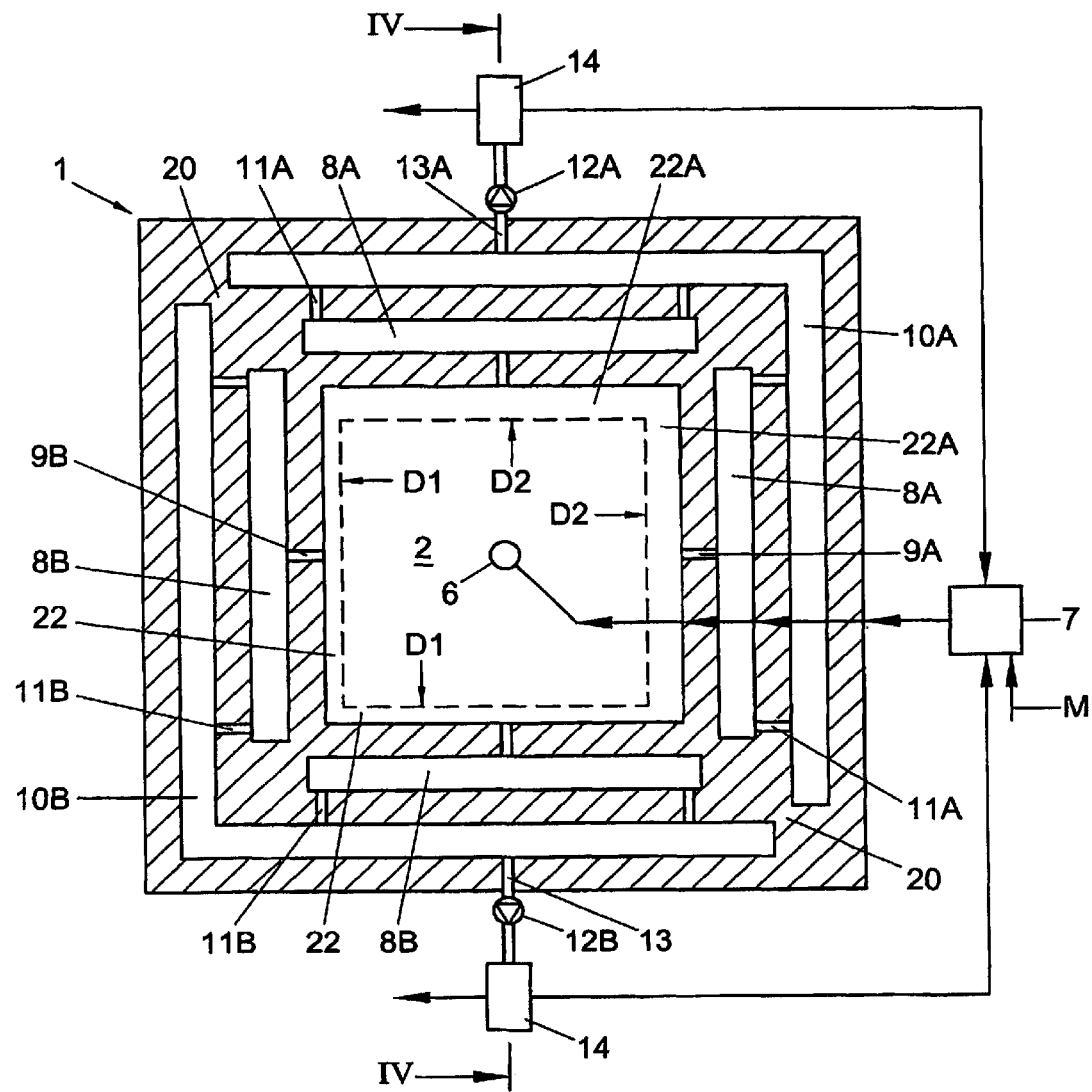
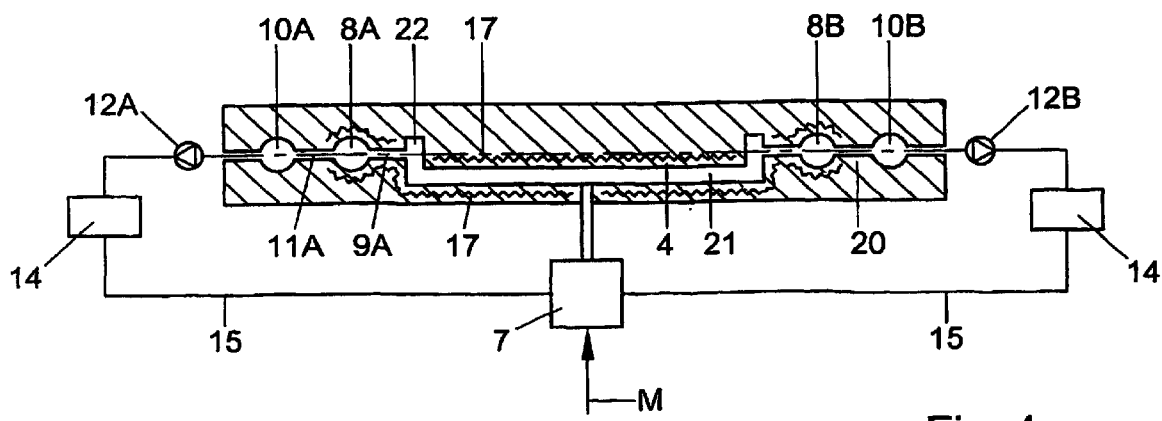
Fig. 3
Fig. 4

APPARATUS AND METHOD FOR INJECTION MOULDING WITH VENTILATION MEANS

This application is the U.S. National Phase of International Application Number PCT/NL2003/000682 filed on 8 Oct. 2003, which is incorporated herein by reference.

BACKGROUND OF THE INVENTION

The invention relates to an apparatus for forming, in particular injection molding, products comprising at least one natural mono- or polymer.

In the international patent application WO 96/30186, a method is described for injection molding products from a mass comprising at least natural polymers such as starch. To that end, the mass is introduced into a closed mold cavity and is pressurized therein, while the mold cavity is heated to a temperature at which, initially, gelatinization of the natural polymers and, then, cross linking thereof occurs. In the mass, a blowing agent, for instance water, is included, which is brought to the boil in the mold cavity and consequently blows bubbles into the mass such that cells are formed therein. In this method, the mold cavity is deaerated through one or more deaeration openings which are in communication with the surroundings, while an amount of mass is introduced into the mold cavity which is somewhat greater than required for completely filling the mold cavity. Thus, it is ensured that the mold cavity is optimally filled, while the surplus, the overdose, is discharged through the deaeration openings.

This method has the advantage that with it, in a particularly simple manner, products with a foamed wall structure can be manufactured from mass including natural polymers. In a comparable manner, for that matter, also natural monomers can be used.

A disadvantage of the apparatus used in this known method is that the blowing agent is discharged directly from the mold cavity, so that uncontrolled foam formation occurs in the mold cavity. Moreover, the overdose flows away through the deaeration openings to the surroundings, at least, to relatively cool surroundings, so that the desired gelatinization and/or cross-linking will not occur therein. This means that a ready product will bear relatively flexible, sticky parts, formed by the overdose, or that these parts will end up in the surroundings so that pollution or clogging of supply and/or discharge means occurs, that ready products will be polluted and like drawbacks. Moreover, such parts cannot be removed in a simple manner.

SUMMARY OF THE INVENTION

The invention contemplates an apparatus of the type described in the opening paragraph, wherein at least a number of the drawbacks mentioned of the above-described apparatus and method carried out therewith are obviated, while their advantages are maintained. To that end, an apparatus according to the invention is characterized by the features of claim 1.

With an apparatus according to the invention, at least one deaeration channel is provided for discharge of gases such as air from the or each mold cavity, while between the or each deaeration channel and the respective mold cavity, each time, at least one overdose space is provided. During use, it is thus provided that the overdose mass which is introduced into the mold cavity is collected in the overdose space or spaces, while the gases can be discharged in a simple manner. Thus, in a particularly simple manner, mass is prevented from flowing away to the surroundings and from leading to pollution.

Moreover, with the aid of such a mold, the pressure buildup in the mold can be regulated in a simple manner. In particular with foaming materials, especially with difficultly foaming materials, this is advantageous.

The or each deaeration channel can be designed as a deaeration opening towards the surroundings or as a channel with such deaeration openings wholly or partly surrounding the mold cavity. In an advantageous embodiment, the or each deaeration channel connects to or can be connected to a discharge apparatus for discharging gases therefrom, while preferably, moreover, means have been provided for treating those gases, for instance for removing moisture such as blowing agent therefrom. With this, recycling is possible in a simple manner while, furthermore, unpleasant diffusion of these gases is prevented. As a result, the working conditions are considerably improved.

It is preferred that heating means be provided for heating the mass in the mold cavity and in the or each overdose space such that the mass in the mold cavity is heated such that cross lining of at least a part of the natural mono- or polymers occurs therein, while in the or each overdose space a skin is formed on the mass present therein. In particular, the heating means are arranged such that in the overdose space(s) too, cross linking of at least a part of the mono- or polymers occurs. Thus, it is ensured that during use, the overdose mass becomes relatively dry and little sticky so that this can be removed in a simple manner. Moreover, in this way, further processing of this overdose becomes possible in a simple manner while pollution of the surroundings is prevented even better.

It is further preferred that means be provided for regulating the pressure in the deaeration channel and/or the overdose space, so that, in a particularly simple manner, for instance the flow speed of the mass in the mold cavity and/or the overdose space, the sizes and rate of formation of cells and other product properties can be influenced. The fact is that, for instance, by creating reduced pressure, in particular a vacuum, in the overdose space and/or in the deaeration channel the mass will flow through the mold cavity relatively rapidly, while blowing agents in the mass will start to boil at a relatively low temperature, at least will form cells in the mass, while, conversely, when the pressure is increased, flow will be slowed down and the blowing action of the blowing agents will only occur at higher temperatures. Therefore, by regulating the pressure in the overdose space and/or the deaeration channel, at least in the mold cavity, the foaming behavior and the flow behavior of the mass can be influenced in a simple manner and consequently, the density, structure and the like of the end product to be formed.

With an apparatus according to the invention, it is further preferred that means be provided for discharging gases from the deaeration channel, while, moreover, preferably, means are provided for drying these gases, at least recovering moisture, blowing means and the like therefrom. These can then be recycled in a simple manner.

The invention further relates to a method for forming a product from a mass comprising at least natural mono- or polymers. With a method according to the invention, the mass is introduced into the mold cavity and heated therein, such that blowing agent present therein is activated. The mold cavity is filled such that at least a portion of the mass flows through openings into an overdose space, while the mold cavity is deaerated via this overdose space and a deaeration channel. In the deaeration channel, at least in the overdose space and/or the mold cavity and/or the deaeration channel, the pressure is regulated such that mass flows into the overdose space in a controlled manner while, furthermore, blowing agent is activated in a controlled manner for forming cells in the mass.

With a method according to the present invention, in a particularly simple manner, a product can be manufactured whose properties can be controlled accurately, in particular the density, cell structure, degree of cross-linking, outside shapes and the like. A method according to the invention can advantageously be used in particular in an apparatus according to the invention.

Preferably, with a method according to the invention, the pressure in the overdose space, the deaeration channel and/or the mold cavity is regulated such that there, during and/or immediately after introduction of the mass into the mold cavity, a pressure prevails which is such that the blowing agent has a relatively high boiling point, whereupon, when the mold cavity is filled further, the pressure is adjusted such that this boiling point is considerably reduced, so that, relatively rapidly, the blowing agent is brought to act relatively forcefully.

With such a method, in a first path, during filling of the mold cavity, relatively much heat can be introduced into the mass without considerable cell formation occurring therein as a result of blowing agent, while, when the mold is further filled with mass, in particular virtually completely, the pressure can be reduced such that the boiling point of the blowing agent, at least its activating temperature, comes to lie below the temperature of the mass in which the blowing agent is included, preferably much lower, so that the blowing agent is suddenly brought to an intense boil at least to blow such that cell formation occurs. It will be directly clear to any skilled person that due to variation of these pressures and a suitable choice of, for instance, blowing agents, polymers, composition of the mass and the like, the wall structure can be accurately regulated.

In a further advantageous embodiment, a mold cavity used with at least two openings, each connecting to an overdose space, while in the, at least in two openings, different pressures and/or flow resistances are generated, such that flow of the mass from a feed opening of the mold cavity in the direction of a first of the openings occurs at a different speed than flow thereof in the direction of the other one of the two openings. Furthermore, as an alternative or additionally, the pressure near the openings can be set to be different such that the blowing agent near the one opening is activated faster than near the other opening. With this, too, the wall structure in different parts of a product to be formed can be accurately regulated. A further advantage that can be achieved herewith is that with differences in wall thickness of parts of the product to be formed, the density of the various wall parts can be adjusted such that a cycle time can be obtained which is exactly sufficient for obtaining the desired cross-linking, at least gelatinization, for each of the parts mentioned. As a result, products with particularly short cycle time can be obtained while, moreover, in a simple manner, relatively thin wall parts are prevented from becoming burned and/or relatively thick wall parts are prevented from being heated insufficiently, or insufficiently long for obtaining the desired cross-linking, at least gelatinization.

BRIEF DESCRIPTION OF THE DRAWINGS

In the further subclaims, further advantageous embodiments are shown of an apparatus and method according to the invention. In clarification of the invention, farther exemplary embodiments of an apparatus and method according to the invention will be father elucidated with reference to the drawing. In the drawing:

FIG. 1 schematically shows, in cross-sectional top plan view, an apparatus according to the invention for use of a method according to the invention;

FIG. 2 shows the apparatus according to FIG. 1, in cross-sectional side view along the line II-II in FIG. 1;

FIG. 3 schematically shows, in cross sectional top plan view, an alternative embodiment of an apparatus according to the invention;

FIG. 4 shows the apparatus according to FIG. 3 in cross-sectional side view along the line IV-IV in FIG. 3;

DETAILED DESCRIPTION OF THE INVENTION

Figure 5:
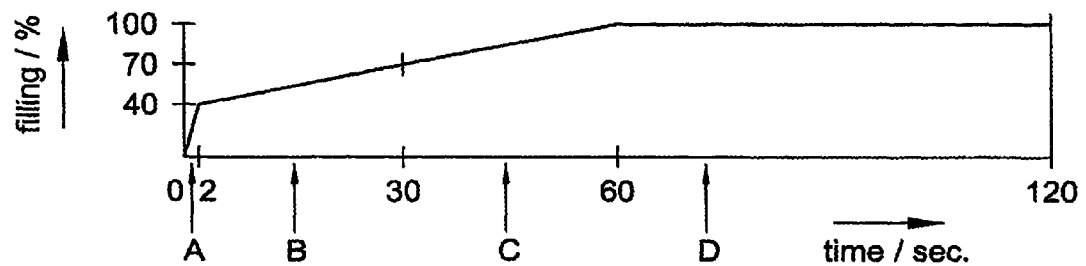
FIG. 5 shows a timeline with the different stages in a baking process according to the invention indicated thereon.

In this description, identical or corresponding parts have identical or corresponding reference numerals. The starting point in this description is a product of relatively simple form, in particular a low, package-shaped product with a bottom and upstanding sidewalls. However, it will be clear that more complicated products too can be manufactured in the same or comparable manner, in comparable molds.

FIGS. 1 and 2 show an apparatus 1 according to the invention, in cross-sectional top plan view and side view, respectively. The cross-section in FIG. 1 is taken directly below the partition surface of the mold, the cross section of FIG. 2 along the line II-II in FIG. 1. The apparatus 1 comprises a mold cavity 2, in which, in FIG. 1, the female part 3 is shown with the male part 4 schematically represented therein in broken lines. In the exemplary embodiment shown, the mold cavity 2 is practically square with, centrally, an injection opening 6. Through the injection opening, a mass to be baked can be introduced which is heated in the mold in order to come to cross-linking of the natural polymers present in the mass. Such masses are described, for instance, in the international patent application WO 98/13184 or in WO 95/20628, which publications are understood to be incorporated herein by reference. Particularly suitable are masses containing starch. With the aid of a supply device 7 suitable to that end, the mass is supplied through the injection opening 6, for instance as a suspension in which blowing agent is included. The suspension can, for instance, be aqueous, while water can function as a blowing agent. It is preferred that, then, the mass is supplied at a relatively low temperature, such that relatively little to no gelatinization has occurred before it is introduced into the mold.

Around the mold cavity 2, a somewhat channel-shaped overdose space 8 extends, which is in communication with the mold cavity 2 via first passage openings 9. Around the overdose space 8, a deaeration channel 10 extends which is in communication with the overdose space 8 via second passage openings 11. In FIG. 2, for the sake of clarity, the overdose space 8 and the deaeration channel 10 are represented relatively largely in relation to the mold cavity 2.

Pumping means 12 connect to the deaeration channel 10 via third passage openings 13. In the embodiment shown in FIG. 1, two third passage openings 18 with two pumps 12 are shown, which are connected to a drying device 14 for, during use, dog air, at least gases, pimped from the deaeration channel 10, while for instance moisture, blowing agent or the like can be led via a first duct 15 to the supply device 7, while the dried air, schematically represented by arrow 16, can be discharged, for instance to be reused. Optionally, a heat exchanger can be included in the drying device 14 for recovering residual heat. The moisture, blowing agent and the like can be recycled and be added to the suspension, at least the mass in the supply device 7. However, the pumps 12 can also be directly connected to the supply device and discharge gas and/or moisture elsewhere.

In the two mold halves 1a, 1b, heating means 17 are included, for instance heating spirals, feed-through lines for hot vapor or other suitable heating means for heating the mold parts 1a, 1b such that mass can be baked in the mold cavity 2. The mold is then heated to, for instance, over 200° C., more in particular, for instance, to between 240 and 270° C. when starch containing mass is processed therein. Selection of the suitable temperatures and temperature paths will be directly clear to the skilled person, depending on, for instance, the mass used, the product sizes and the like. In the embodiment shown in FIG. 2, the heating means 17 extend at least in the male and the female part of the mold cavity and along the overdose space 8, so that mass flowing therein during use is at least dried and optionally also baked, so that it is no longer sticky.

A mold according to FIGS. 1 and 2 can be used as follows.

A mass M is brought to the supply device 7 and, there, mixed with moisture, in particular blowing agent and such reusable base materials recycled via the ducts 15, and is then brought, via the duct 20, to the injection opening 6 through which the mass, preferably with the mold 1 closed, is injected into the mold cavity 2. With the aid of the pumps 12, the pressure in the deaeration channel 10, the overdose space 8 and the mold cavity 2 is then regulated. With it, for instance flow behavior, blowing behavior and the like can be set. This can be understood as follows.

The mass is brought into the mold cavity 2 at a relatively high temperature and some counter pressure. The stages described hereinafter are indicated in Table 1 in the last four columns by a "1" in the respective column. As a result, the pressure in the mold cavity 2 increases, so that the boiling point of the blowing agent, for instance water, also increases. This means that relatively much mass can be displaced over a relatively large distance in the mold cavity 2, virtually without blow occurring. Then, the injection opening 6 is closed and via the first, second and third passage openings 9, 11, 13, air is sucked away with the aid of the pumps 12, so that the pressure in the mold cavity 2 is suddenly reduced. To that end, for instance in the deaeration channel 10, a slight vacuum can be set. As a result, the mass will be sucked in the direction of, and for a small part, the overdose, into the overdose space 8, while the boiling point of the blowing agent is considerably reduced as a result of the reduction of the pressure, to below the temperature of the mass in the mold cavity 2. As a result, the blowing agent will suddenly become active and blow cells into the wall structure. These cells will occur in particular in the core of the mass, since, as a result of the relatively high temperature, the mass which has contacted the walls of the mold cavity 2 will already have gelatinized to some extent or even be baked to some extent and have formed a skin before the action of the blowing agent occurs.

In the mold cavity 2 slightly more mass is introduced than is required for forming the desired product. As a result, an overdose of mass will flow through the first passage opening 9 into the overdose space 8 and be baked therein. This means that the overdose is simply collected in the mold and, since the passage openings 9 are located in the closing surface of the mold, is removed from the mold with the product, so that pollution of the surroundings is prevented in a simple manner. It is preferred that the overdose can be carried along in this manner by the product, although, naturally, the mold can also be designed such that the overdose remains behind, for instance in the overdose space 8 and can be removed separately. This can even be done when the overdose is not baked, at least not completely. The overdose will then close off the first passage openings, so that in the final part of the baking process, the pressure in the mold cavity will become maximal.

It will be clear that through a suitable choice of the passage openings 9, 11, pressure differences can be built up between the deaeration channel 10, the overdose space 8 and the mold cavity 2, so that the speeds of the air and the mass can be accurately controlled. The fact is that reduction of the pressure in the overdose space 8 will lead to acceleration of the flow of the mass in the mold cavity and through the first passage openings, but also to adjustment of the activation temperature for the blowing agent. With this, the density of the product to be formed, the distribution and size of the cells as well as the possible length of the flow paths and the like can be accurately set.

In FIGS. 3 and 4, in views comparable to those of FIGS. 1 and 2, an alternative embodiment of a mold 1 according to the invention is shown, while the mold cavity 2 is surrounded by overdose spaces 8a, 8b and deaeration channels 10a, 10b. In this embodiment, two first overdose spaces 8a are connected via first passage openings 9a to the mold cavity and, via second passage openings 11a to a first deaeration channel 10a In a comparable manner, two second overdose spaces 8b are connected via first passage openings 9b to the mold cavity and via second passage openings 11b to the second deaeration channel 10b. The second deaeration channel 10 is connected, via a third passage opening 13, to the second pump 12b. The first overdose spaces 8a and the first deaeration channel 10a are physically separated from the second overdose spaces 8b and the second deaeration channel 10b by wall parts 20. As a result of this, the pressure in the first overdose spaces 8a can therefore be set to be different than the pressure in the second overdose spaces 8b, and also in the first deaeration channel 10a and the second deaeration channel 10b, respectively, with the aid of the first pump 12a or the second pump 12b, respectively. Moreover, by varying, for instance, the second passages 11 between the respective overdose spaces 8 and the deaeration channels 10, the pressure in the different overdose spaces 8 can also be set to be individually different. With this, in particular the flow behavior of the mass in the mold cavity 2 can be influenced, which can, for instance, be advantageous with the mold cavity shown in FIGS. 3 and 4. In this mold cavity 2, a flat center part 21 is provided, equipped with an upstanding longitudinal edge 22, comparable to the one shown in FIGS. 1 and 2. However, here, the male part 4 has been slightly off-centered, so that in FIG. 3 on the left hand side and at the bottom, the thickness $D_1$ of the upstanding edge 22 is considerably smaller than the thickness $D_2$ of the farther two longitudinal edge parts 22a. Bay, now, setting the pressure and/or the air displacement in the first overdose spaces 8a and the first deaeration channels 10a to be different from that in the second overdose spaces 8b and the second deaeration channel 10b, in particular a lower pressure and/or a higher air displacement, it can be ensured that the flow speed of the mass in the direction of the spaces for forming the thicker edge parts 22a will be somewhat greater than that in the opposite direction, so that a uniform filling of the mold cavity 2 is obtained. At least, it is better controlled than with the same pressure prevailing everywhere. Thus, is can be ensured that a uniform wall structure can be obtained with different wall thicknesses. By specific regulation of the pressures, with equal wall thicknesses too, for that matter, the wall structure of different parts can be adjusted, for instance by having a part of the mold cavity fill up with mass more rapidly than another part, so that in the faster filled-up part, for instance, smaller cells will be formed. By, precisely, utilizing one or more deaeration channels and one or more overdose spaces such that pressures, flow speeds and/or the moment the blowing agents come into action can be regulated, the product properties can be accurately controlled. Thus, a large choice in product and design is obtained, while all desired product properties can be realized.

In an alternative embodiment (not shown) in first and/or second passage openings, regulating means are provided which can be controlled from outside of the mold 1, allowing regulation of the flow rate of at least a number and preferably each passage opening. With such an embodiment, too, in a simple manner, the flow pattern of mass in the mold cavity, the action of blowing agent, the filing pressure and the like can be controlled in the entire mold cavity or in parts thereof, so that product properties can be accurately set. It will be clear that to that end, sealers known per se can simply be built in in a mold according to, for instance, FIG. 1 or 3, but also in molds in which for instance only one deaeration channel is provided, no separate overdose space has been arranged or in which the mold is deaerated directly to the surroundings.

A simple recipe of a mass which was used in experiments is given in Table 3. This serves only as an example and should not be taken as being limitative.

In FIG. 5, schematically, the various stages in a method according to the invention are indicated, wherein the starting point is an injection volume of 40% (vol. %) of the volume of the mold cavity, i.e. of the product to be formed, which means that approximately 60% of the filling is to be obtained by expansion and/or foaming of the material in the mold cavity. In FIG. 5, on a timeline, the manner in which the different stages take place is plotted.

In the first approximately 2 seconds, the total amount of suspension is introduced into the mold cavity, which, then, is filled for approximately 40%. After approximately 80 seconds, the mold cavity is filled for approximately 70%, as a result of heating and foaming, while after approximately 60 seconds, the mold is completely filled. After approximately 120 seconds, the product is ready and can be taken from the mold cavity. In this production process, in fact, four steps can be distinguished, indicated as the steps A, B, C and D. The first step A is the injection step, between 0 and 2 seconds. The second step is the heating step B, wherein, substantially, gelatinization of the natural polymers and, already, partial foaming in the mass occurs. In stage C, between approximately 30 and 60 seconds, further foaming follows. This stage in particular is interesting for the present invention, as will be elucidated further. Then, in the final stage, D, the actual baking of the product in the mold cavity follows, while cross-linking of the polymers and/or monomers occurs. After approximately 120 seconds, the product is taken out and is ready in baked, form-retaining condition.

Figure 6:
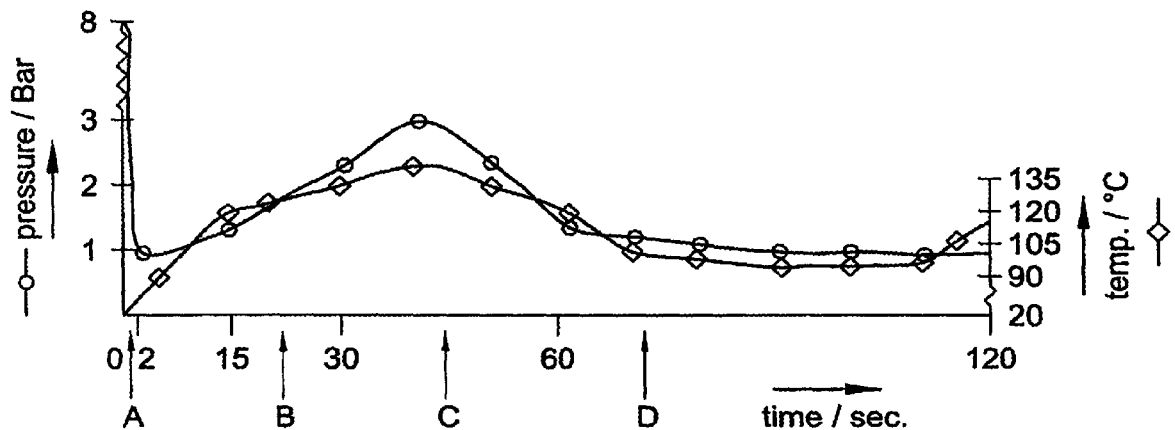
FIG. 6 shows the temperature development plotted versus the pressure in the mold with a normal method.

In FIG. 6, for a customary manufacturing technique as described in the introduction of this application, the pressure development and the temperature development in the mold cavity is represented, plotted versus the time. Along the left hand vertical axis, the pressure in the mold cavity is indicated in bar, along the right hand vertical axis, the temperature in the mold in degrees Centigrade. Along the horizontal axis, the time scale is represented. From this graph, it clearly appears that during the injection stage A, the pressure rapidly decreases from, for instance, approximately 8 bar to approximately 1 bar atmospheric pressure, whereupon, in the second stage B, the pressure rapidly increases, which pressure increase continues in the first part of the third stage C, whereupon the pressure decreases again until in the beginning of the fourth stage D when, again, a pressure of approximately 1 bar is reached. As appears from Table 1, the pressure of approximately 1 bar in the fourth stage D is reached around approximately 90 seconds. The maximum pressure that occurs after the injection stage A is approximately 3 bar and is reached after approximately 40 seconds.

From FIG. 6 it appears that with the known method, the temperature in the mass in the first stage A increases relatively rapidly from approximately 20° C. to approximately 40° C. after 2 seconds, whereupon the temperature gradually increases to approximately 90° C. after 5 seconds. Then, the temperature slowly rises further to approximately 130° C. after 40 seconds, whereupon the temperature slowly decreases to approximately −110° C. after 60 seconds and approximately 100° C. after 90 seconds. At the end of the fourth stage D, the temperature rapidly increases again to approximately 120° C. upon opening of the mold after 120 seconds.

With a method according to the invention, wherein use is made of a comparable mold cavity and the same mass as used in the method as described in FIG. 6, the pressure and temperature development in the first stage A, the injection stage, are approximately equal to those in the known method as represented in FIG. 6. Also during the second stage, between 2 and 30 seconds, the pressure and temperature development are comparable. However, in the method according to the invention, after approximately 30 seconds, the pressure in the mold cavity is considerably decreased in that in the vacuum channels, at least partly, a vacuum is created by suction. As a result, the pressure in the mold cavity rapidly decreases from approximately 2.3 bar after 30 seconds to approximately 0.25 bar at 45 seconds, which pressure is maintained to approximately 110 seconds. Thereafter, the vacuum is removed, so that the pressure rises relatively rapidly to 1 bar upon removal of the product after 120 seconds. As clearly appears from the drawing, the temperature in the mold cavity follows the rapid pressure change after 30 seconds, such that the temperature decreases relatively rapidly to approximately 65° C. after 45 seconds, so that the temperature of the mass at that pressure is brought and maintained above the boiling point of the foaming agents, in particular water, so that accelerated foaming occurs. This temperature is maintained up to approximately 100 seconds. Thereafter, the temperature increases relatively rapidly to approximately 122° C. upon opening of the mold after approximately 120 seconds.

From Table 2, the development of the boiling temperature of the foaming agent in the mass, in particular water, can be derived with different pressures prevailing in the mold cavity. In Table 2, the starting point is one gram of mass introduced into a mold cavity, while the specific heat of starch and of water and the required evaporation energy for evaporating the foaming agent, in particular water, from the mass are indicated. Indicated here are the energy required for heating the mass in the mold cavity, energy required for evaporating the amount of foaming agent mentioned and the total required amount of energy for baking the product, at least the one gram of mass. A percentage of required energy is indicated there plotted versus the energy required in a method wherein a pressure of 1 bar is maintained, which amount of energy is set at 100. It is clear that at a pressure of 0.2 bar, approximately 8% less energy is required for baking the product, while furthermore relatively little vapor is obtained, namely, approximately 1.5 liters. By contrast, at a pressure of 2.7 bars, approximately 1.9 liters of vapor are obtained in the mold cavity, while, moreover, approximately 0.6% more energy is to be supplied.

It has appeared to be advantageous to reduce the pressure according to the invention in the mold cavity when approximately 70% of the mold cavity has been filled, at least if approximately 50% of the foam formation has occurred. However, it will be clear that according to the invention, the foam structure can be influenced in a simple manner by changing the pressure during, in particular, parts of the second and third stages B, C, that is, during gelatinization and foam formation.

Experiments show that upon application of the reduced pressure after approximately 30 seconds, at least when the mold cavity is filled for approximately 70%, an efficiency of approximately 92% is obtained, at a vacuum level of approximately 0.3 bars absolute, versus an efficiency of approximately 78% if no vacuum is applied.

A method according to the invention is in particular also advantageous when several points of injection in one and the same mold cavity are used. The fact is that when the pressures around the injection opening are locally changed, for instance, foam formation can be accelerated or, conversely, decelerated while also the gelatinization can be accelerated and/or decelerated. Thus, it can be ensured that through the entire product, a relatively uniform foam formation is obtained, or conversely, the foam formation in different parts of the product can be adjusted. Experiments have demonstrated that when using a mold as shown in FIGS. 3 and 4, wherein in one part of the mold cavity a pressure and temperature regulation according to FIG. 6 was followed, while in the other part of the mold cavity a pressure and temperature regulation according to FIG. 7 was followed, a product was obtained which, in said first part, obtained a more compact composition than in the second part.

Pressure reduction in the overdose channel will cause the mass to be "sucked" through the mold cavity in an accelerated manner, so that longer and more complex flow paths can be used and a better filling can be achieved.

During experiments, it has also appeared that when regulating the pressure in at least the overdose and vacuum channels, the vapor generated in the mold could simply be sucked away and be discharged, could be cleaned and/or could be reused. The temperature and the air humidity in the vicinity of the mold could then be regulated relatively simply. Thus, the working conditions of those carrying out the experiments were positively influenced. Moreover, in this manner, also energetic advantages were achieved.

Figure 7:
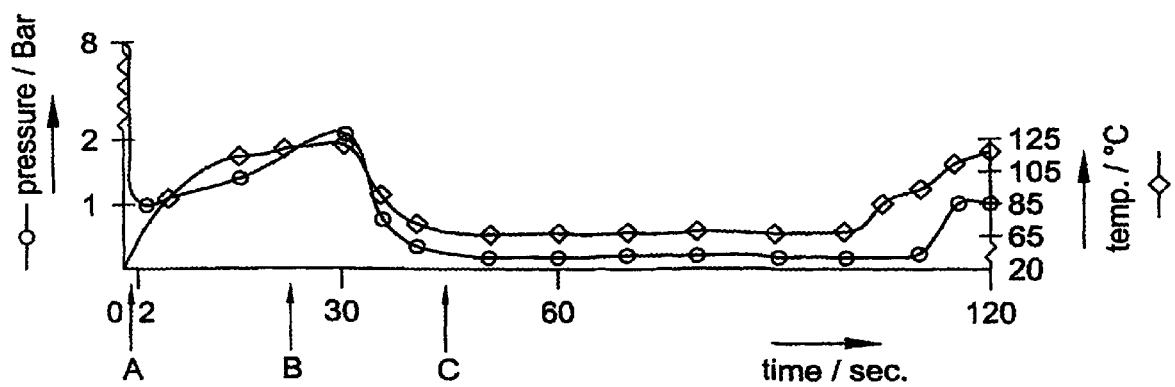
FIG. 7 shows the temperature development in the mold plotted versus the pressure with a method according to the present invention.

In the experiments described with reference to FIGS. 5-7, each time, the same amount of mass was added, whereupon different reduced pressures were applied in the mold. It appeared therefrom that with an increase of the reduced pressure, the product obtained became lighter. In Table 4, a recipe of a mass is given which flows relatively difficultly in a mold and was used for a relatively large product described hereinbelow. Accelerated foaming (relative to a standard mold as described in WO 96/30186) appeared advantageous in particular with these larger products. At virtually no reduced pressure, a product of approximately 130 grams was obtained, while with the cycle as described with reference to FIG. 7, the product weighed approximately 115 grams. Simultaneously, the necessary cycle time decreased from approximately 125 seconds to approximately 115 seconds. With the cycles described in FIGS. 6 and 7 however, each time, a cycle time of 120 seconds is maintained, in order to simplify comparison. Furthermore, when adjusting the pressure, the amount of mass to be introduced can be adjusted as well; with lower pressures less mass.

The invention is not limited in any way to the exemplary embodiments represented in the description and the drawings. Many variations thereon are possible within the framework of the invention as outlined by the claims.

For instance, a mold according to the invention can be provided with more than one mold cavity, while each mold cavity individually can be provided with one or more overdose spaces and/or one or more deaeration channels connected thereto, but wherein, also, one or more overdose spaces and/or deaeration channels can be connected to several cavities. Naturally, molds for use in an apparatus according to the invention can have all desired shapes, be releasing or provided with moveable parts such as slides, cores and the like. Optionally, in an apparatus according to the invention, a core can also be pushed into the mold cavity dung or after introduction of the desired amount of mass or, conversely, be pulled therefrom, in order to effect sudden or gradual pressure change in the mold cavity. With this, too, the degree of cell formation caused by the activity of the blowing agent can be influenced in a simple manner. Also, in the mold according to the invention, several injection openings can be provided, while, moreover, also two or more components of injection technique can be used. Although it has been indicated that in an advantageous manner, masses can be processed in which starch is included, it will be clear that other polymers too, in particular natural polymers, can be used within an apparatus and method according to the invention, such as, for instance, tapioca. Also, masses can be processed in which, in addition to natural polymers, also plastics, fillers and the like have been incorporated.

These and many comparable variations are understood to fall within the framework of the invention as outlined by the claims.

TABLE 1

| time | Normal pressure | Including vacuum | Normal temperature | Including vacuum | Injection | heating/ foaming | baking | water evaporated |
|---|---|---|---|---|---|---|---|---|
| 0 | 1 | 1 | 20 | 20 | 1 | | | |
| 5 | 1 | 1 | 90 | 90 | 1 | | | |
| 10 | 1.1 | 1.1 | 105 | 105 | | 1 | | |
| 15 | 1.5 | 1.5 | 111 | 111 | | 1 | | |
| 20 | 1.8 | 1.8 | 118 | 118 | | 1 | | |
| 25 | 2.1 | 2.1 | 122 | 122 | | 1 | | |
| 30 | 2.3 | 2.3 | 125 | 125 | | 1 | | |
| 35 | 2.7 | 0.8 | 130 | 93 | | 1 | | |
| 40 | 3 | 0.4 | 133 | 76 | | 1 | | |
| 45 | 2.8 | 0.25 | 131 | 65 | | | 1 | |
| 50 | 2.4 | 0.25 | 126 | 65 | | | | 1 |

TABLE 1-continued

| time | Normal pressure | Including vacuum | Normal temperature | Including vacuum | Injection | heating/ foaming | baking | water evaporated |
|---|---|---|---|---|---|---|---|---|
| 55 | 1.9 | 0.25 | 119 | 66 | | | 1 | |
| 60 | 1.45 | 0.25 | 110 | 65 | | | 1 | |
| 65 | 1.27 | 0.25 | 108 | 65 | | | 1 | |
| 70 | 1.2 | 0.25 | 107 | 65 | | | 1 | |
| 75 | 1.1 | 0.25 | 105 | 65 | | | 1 | |
| 80 | 1.05 | 0.25 | 102 | 65 | | | 1 | |
| 85 | 1.05 | 0.25 | 102 | 65 | | | 1 | |
| 90 | 1 | 0.25 | 100 | 65 | | | 1 | |
| 95 | 1 | 0.25 | 100 | 65 | | | 1 | |
| 100 | 1 | 0.25 | 100 | 65 | | | 1 | |
| 105 | 1 | 0.25 | 100 | 85 | | | 1 | |
| 110 | 1 | 0.25 | 100 | 95 | | | | 1 |
| 115 | 1 | 1 | 105 | 110 | | | | 1 |
| 120 | 1 | 1 | 112 | 122 | | | | 1 | time in sec.
pressure in Bar
pressure inc. vacuum in Bar
temperature in ° C.
temperature incl vacuum in ° C.

TABLE 2

Feed

| Dosage | 1 | g |
| Specific heat starch | 1.2 | J/g · K |
| Specific heat water | 4.2 | J/g · K |
| Evaporation energy | 2258 | J/g |

Discharge

| Pressure | bar | 0.2 | 0.31 | 0.47 | 0.7 | 1 | 1.43 | 1.98 | 2.7 |
|---|---|---|---|---|---|---|---|---|---|
| Boiling temperature | C. | 60 | 70 | 80 | 90 | 100 | 110 | 120 | 130 |
| Energy heating | J | 216 | 270 | 324 | 378 | 432 | 486 | 540 | 594 |
| Energy evaporation | J | 2258 | 2258 | 2258 | 2258 | 2258 | 2258 | 2258 | 2258 |
| Total | J | 2474 | 2528 | 2582 | 2636 | 2690 | 2744 | 2798 | 2852 |
| In-/decrease (%) | | 91.97 | 93.98 | 95.99 | 97.99 | 100.00 | 102.01 | 104.01 | 106.02 |
| Amount vapor | liter | 1.54 | 1.58 | 1.63 | 1.68 | 1.72 | 1.77 | 1.82 | 1.86 |

TABLE 3

| water | 1500 ml |
| silicon HY oil | 22 ml |
| potato starch food grade | 1000 grams |
| hydroxyl-apatite | 2 grams |
| china clay spec | 75 grams |
| hydrocarb 95T | 75 grams |
| Xanthan gum Keltrol F | 2 grams |
| Guar gum | 8 grams |
| Cellulose white (approximately 2.5 mm) | 120 grams |

TABLE 4

| water | 1980 grams |
| silicon HY oil | 23 ml |
| cationic starch | 40 grams |
| cellulose fiber white (approximately 2.5 mm) | 120 grams |
| potato starch food grade | 1000 grams |
| cationic colorant | 8 grams |
| Hydrocarb 95 T | 75 grams |
| China clay spec | 75 grams |
| Xanthan gum Keltrol F | 10 grams |
| Guar gum | 8 grams |
| Calcium stearate | 5 grams |
| Viscose fiber 8 mm | 60 grams |
| Phosphate buffer | 9 grams |
| Natural latex | 300 grams |

What is claimed is:

1. A method for forming a product from a mass comprising at least natural mono-or polymers, the method comprising:
introducing said mass into a mold cavity in fluid communication with an overdose space and a deaeration channel and heating the mass therein, wherein a blowing agent is activated during the introduction and heating of the mass in the mold cavity such that a portion of the mass flows through openings into said overdose space, reducing a pressure inside the mold after the mold is substantially filled with the mass, by reducing the pressure below the boiling pressure of the blowing agent, deaerating the mold cavity via said overdose space and said deaeration channel and regulating the pressure in the mold from said deaeration channel such that in a controlled manner mass flows into the overdose space and in a controlled manner the blowing agent is activated for forming cells in the mass, wherein the mold cavity is used with at least two openings which connect to the overdose space, wherein, in the at least two openings, different pressures and/or flow resistances are independently generated such that flow of the mass from an injection opening in the direction of a first of said openings is carried out at a different speed than flow of it in the direction of the other of said two openings.

2. A method according to claim 1, wherein in at least the overdose space and/or the deaeration channel a reduced pressure is generated in relation to the mold cavity such that the pressure in the mold cavity is reduced and, with it, the boiling point of the blowing agent is increased.

3. A method according to claim 1, wherein the pressure in the overdose space and/or the deaeration channel is varied such, that immediately after introduction of the mass into the mold cavity, the blowing agent has a high boiling point there, whereupon the pressure is adjusted such that the boiling point is considerably reduced, at least to close to or below the actual temperature of the mass in the mold cavity, such that the blowing agent boils virtually immediately and blows cells into the mass during or prior to cross-linking of the natural mono or polymers.

4. A method according to claim 1, wherein said different pressures are generated in that the openings are connected to different overdose spaces and/or different deaeration channels.

5. A method according to claim 1, wherein gas from the deaeration channel, is sucked away, wherein said gas is dried, such that blowing agent is separated therefrom, which blowing agent is recycled.

6. A method according to claim 1, wherein the mass which flows into the overdose space is heated there, preferably to at least a temperature at which cross-linking of the natural mono-or polymers occurs.

7. A method according to claim 5, wherein the gas comprises air.

8. A method according to claim 1, wherein during the pressure reduction at least part of the blowing agent evaporates.

9. A method according to claim 1, wherein the blowing agent includes water.

\* \* \* \* \*

UNITED STATES PATENT AND TRADEMARK OFFICE
CERTIFICATE OF CORRECTION

PATENT NO. : 7,850,883 B2
APPLICATION NO. : 10/529950
DATED : December 14, 2010
INVENTOR(S) : Jan Wietze Huisman It is certified that error appears in the above-identified patent and that said Letters Patent is hereby corrected as shown below:

Column 2, line 20:

Reads: "such that cross lining of at least"

Should read: --such that cross linking of at least--

Column 2, line 40:

Reads: "dearation channel the mass"

Should read: --dearation channel, the mass--

Column 3, line 32:

Reads: "intense boil at least"

Should read: --intense boil, at least--

Column 3, line 39:

Reads: "a mold cavity used"

Should read: --a mold cavity is used--

Column 3, line 67:

Reads: "of the invention, farther exemplary"

Should read: --of the invention, further exemplary--

Column 4, line 2:

Reads: "will be father elucidated"

Should read: --will be further elucidated--

Signed and Sealed this
Twenty-eighth Day of August, 2012

David J. Kappos
*Director of the United States Patent and Trademark Office*

CERTIFICATE OF CORRECTION (continued)
U.S. Pat. No. 7,850,883 B2

Column 4, line 65:

Reads: "passage openings 18 with two pumps"

Should read: --passage openings 13 with two pumps--

Column 4, line 67:

Reads: "during use, dog air, at least"

Should read: --during use, drying air, at least--

Column 4, line 67:

Reads: "at least gases, pimped from"

Should read: --at least gases, pumped from--

Column 6, line 57:

Reads: "$D_2$ of the farther two"

Should read: --$D_2$ of the further two--

Column 6, line 57:

Reads: "Bay, now, setting the"

Should read: --By, now, setting the--

Column 7, line 12:

Reads: "a large choice in product and design"

Should read: --a large choice in production and design--

Column 7, line 41:

Reads: "approximately 80 seconds"

Should read: --approximately 30 seconds--

Column 8, line 19:

Reads: "approximately -110° C. after"

Should read: --approximately 110° C. after--